United States Patent [15] 3,673,318

Olsen et al. [45] June 27, 1972

[54] VIDEO BLANKING AND SOUND MUTING CIRCUIT

[72] Inventors: Perry Charles Olsen; Pak Chong Tang, both of Indianapolis, Ind.

[73] Assignee: RCA Corporation

[22] Filed: Feb. 3, 1971

[21] Appl. No.: 112,178

[52] U.S. Cl. ....178/5.8 R, 178/7.3 R
[51] Int. Cl. ....H04n 5/44
[58] Field of Search ....178/5.8 R, 7.3 R

[56] References Cited

UNITED STATES PATENTS

| | | | |
|---|---|---|---|
| 2,602,855 | 7/1952 | Cunningham | 178/5.8 R |
| 3,011,017 | 11/1961 | Oeler et al. | 178/5.8 R |
| 3,018,326 | 1/1962 | Petrick et al. | 178/5.8 R |
| 3,096,397 | 7/1963 | Stachowiak et al. | 178/5.8 R |
| 3,131,255 | 4/1964 | Di Nardo | 178/5.8 R |

*Primary Examiner*—Robert L. Richardson
*Attorney*—Eugene M. Whitacre

[57] ABSTRACT

A switching circuit, dependent solely on the value of fixed impedances and supplied direct current voltages, blanks the picture and mutes the sound of a television receiver during its channel selection tuning, either manually or automatically by remote control.

10 Claims, 11 Drawing Figures

INVENTOR.
Perry C. Olsen &
Pak C. Tang
BY Charles Brodsky
ATTORNEY

INVENTORS
Perry C. Olsen &
Pak C. Tang
BY Charles Brodsky
ATTORNEY

VIDEO BLANKING AND SOUND MUTING CIRCUIT

BACKGROUND OF THE INVENTION

1. Field of the Invention

This invention relates to television receivers, in general, and to a circuit for blanking its picture and muting its sound during tuning from one desired channel to another, in particular.

2. Description of the Prior Art

Circuits of this general nature have been described in the prior art. Typical of such circuits are those disclosed in U.S. Pat. Nos. 3,011,017—Oeler, 3,096,397—Stachowiak, and 3,131,255—DiNardo. Each of these patents point out the desirability of disabling either or both of the television picture and sound apparatus during channel selection. As is now well appreciated, such disabling serves to eliminate any unpleasant picture flickering or sound increase during the time interval between loss of one desired signal and retention of another.

The systems described in the above-noted patents operate in an environment where power tuning is incorporated to switch between the program channels on the receiver. Each arrangement includes a motor cooperating with the television tuner to automatically change channels in response to a remote control order. Operation of the energized motor interrupts various receiver connections, for example, to permit the cathode of the television kinescope to rise to a cutoff potential that will blank the picture tube image and to open circuit the energizing potentials applied to the sound system. Manual channel selection, on the other hand—as in U.S. Pat. Nos. 3,011,017 and 3,131,255—prevents the energization of the motor and defeats the video blanking and sound muting feature theretofor provided. Not all receivers are equipped for remote control operation, however, but incorporate similar apparatus as automatic gain control systems which respond to the loss of signal between channels to produce such interference as the energizing motor seeks to eliminate in the remote controlled set.

SUMMARY OF THE INVENTION

As will become clear hereinafter, the present invention is directed to a circuit which responds to rotations in the mechanical tuner of the receiver to effect the blanking and muting actions for all unprogramed channels, independently of whether the rotation is afforded through manual or remote control means. As such, the arrangement is useful in either class of receiver, since all that is necessary is for the arrangement of the tuner to provide a first set of switching contacts for use in channel programing. Closure of such contacts for an undesired channel can serve to blank the video picture or mute its sound in any appropriate manner—such as by grounding the video and audio output stages—while similar control of a second set of contacts can be used to provide these functions during selection from one adjacent channel to another. Such configuration thus senses the tuner conditioning rather than that of the remote powered motor and, as such, can comprise a passive switching network which is relatively simple to construct and substantially universal in its application. The arrangement to be particularly described will be seen to operate solely on supplied direct current voltages, and in a manner affording great reliability due to its dependence on fixed resistor values and independent of such previously used devices as transistors, whose operating characteristics have a tendency to substantially change with age and/or temperature. As will be seen from the described embodiment, the values of the resistors employed are readily calculable once the voltage conditions needed for the switch operations have been defined.

BRIEF DESCRIPTION OF THE DRAWINGS

These and other advantages of the invention will be more readily apparent from a consideration of the following description taken in connection with the accompanying drawings in which.

DETAILED DESCRIPTION OF THE DRAWINGS

Figure 1A:
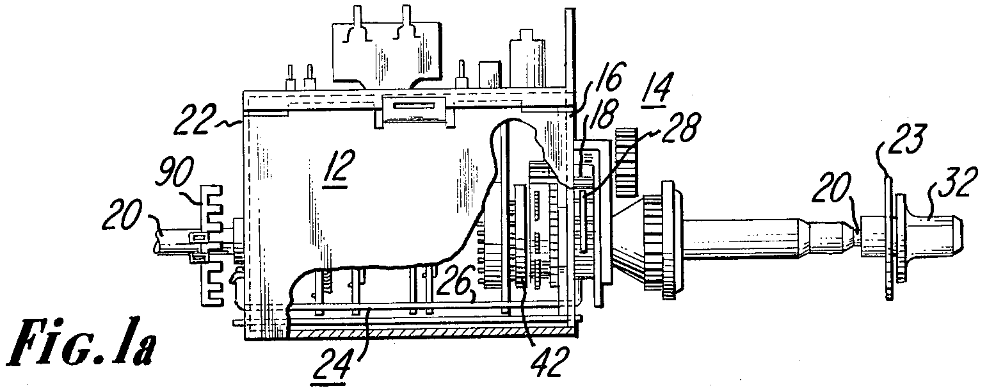
FIGS. 1*a*–1*e* schematically show portions of a television tuner having a switch arrangement useful in carrying out the video blanking and sound muting functions of the present invention.

A television tuner 12, in conjunction with which the video blanking and sound muting circuit of the invention is particularly applicable, may be of the detent type, having a gear assembly 14 mounted on its front plate 16. The gear assembly conventionally includes an index wheel 18 having a plurality of detents and positioned on a channel selecting shaft 20 which passes through the front plate 16 and a rear plate 22. A torsion spring detent 24, including an intermediate portion 26 extending parallel to the channel selector tuning shaft 20 and a right angle portion 28, engages the index wheel 18 to cause detent action during channel changes. Specifically, one end of the right angle portion 28 has a bend 30 which resiliently engages the detents of the index wheel 18.

When the tuner channel selection knob 32 is rotated, the shaft 20 to which it is joined rotates, causing the index wheel 18 to rotate and cause a rearrangement of the electrical components within the tuner, to tune it to a desired channel. The torsion spring detent 24 during the rotational movement rides on the periphery of the index wheel 18, thereby effectuating a detent action to provide indexing of the channel selecting shaft.

Figure 1C:
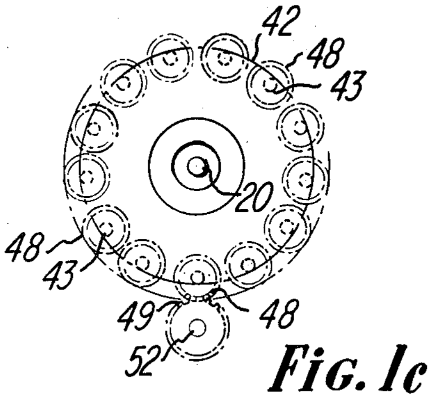
Figure 1B:
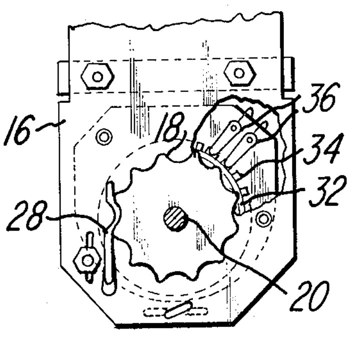
Figure 1E:
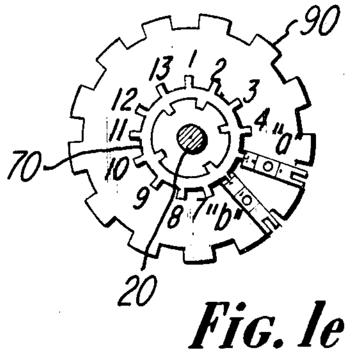

Internal to the tuner are a series of rotary switches, best shown in FIG. 1*b*, which interconnect the electrical components of the tuner associated with each of the detent or channel positions. The rotary switches, only one of which is shown, include a rotor portion 32 which is secured for rotation with the channel selecting shaft 20. On the periphery of the rotor 32 are a series of rotor contacts 34 which are adapted to engage stator contacts 36 such that rotation of the rotor 32 to different detent positions bring different ones of the rotor contacts 34 into engagement with the stator contacts 36. Such tuner is generally of the step-by-step channel-tuning variety having detect-controlled channel selector stop positions over a full 360° rotation of the tuning shaft 20, for each of the 12 VHF-band channels and for the UHF channel band. A movable manual control element or ring 23 is also fitted onto the tuning shaft 20 and connects with the interior operating mechanism of the tuning system for longitudinal movement toward and away from the front plate 16, in addition to rotation in either direction. In particular, rotation of the control 23 when moved toward the front plate 16, serves to provide fine tuning, preset tuning and programing adjustments of the system for the VHF band of signal frequencies.

Figure 1D:
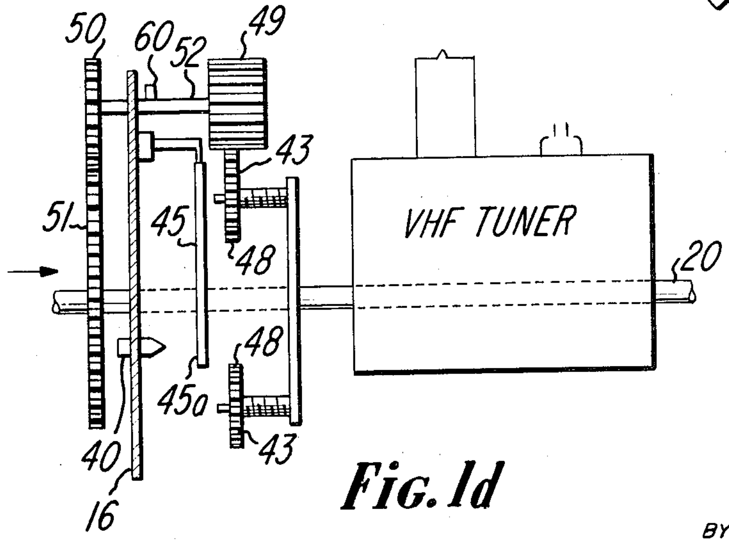

To accomplish such functions, the tuner is also provided with a 13-position turrent 42 which is mounted on the tuning shaft 20 between the front plate 16 and back plate 22, as indicated in FIG. 1*c*. This turret carries 13 rotatable fine tuning or tuning adjustment screws 43, extending through the turret in a circular row near the periphery thereof and angularly spaced and in parallel relation to each other. As the turret 42 rotates with the tuning shaft 20 through the various tuning positions for the VHF Channels No. 2–13, the tips of 12 of the 13 tuning screws progressively come under one end of a fine tuning control lever 45 of the tuner (FIG. 1*d*) to move it to different positions for fine tuning such channels. The top of the 13th tuning screw also comes under the control lever 45 for use in bypassing the UHF channel if desired, as when no such channel is operative in the viewer's geographical listening area. The heads 48 of the tuning screws 43 are pinion-gears which, when turned clockwise or counterclockwise by a fine tuning gear 49, move the screws out or in with respect to the tuning lever. The opposite ends of the tuning screws cooperate as a fine-tuning plunger with internal fine tuning means (not shown), to thus adjust the fine tuning of the VHF channels at each stop position. As indicated, rotation of the fine tuning gear 49 is effected through corresponding movement of gears 50, 51 brought about by rotation of the tuning shaft 20 when moved toward the front plate 16 and by corresponding rotation of the connecting shaft 52.

In accordance with the teachings of the present invention, the fine tuning control lever 45 has a lip portion **45*a* positioned under a screw 40 which is electrically connected to the tuner front plate 16 which is electrically grounded. The other end of the lever is electrically coupled to a terminal post 60, connected to the various components of the blanking and muting circuit, as described below. Pushing in on the control 23 and rotation of it in a counterclockwise direction moves the pinion gear heads 48 towards physical contact with the tuning control lever 45 to move lip portion 45*a* to contact the grounded screw 40. The channel associated with such gear head 48 is thus an undesired or unprogramed channel and, as will be seen hereinafter, causes the television picture to blank and its sound to mute when tuning to such undesired channel. Rotation of the control 23 in a clockwise direction, however, moves the pinion gears away from the lever 45, to prevent the grounding of the fine tuning components of the tuner associated therewith in pre-programing desired channels. This lever arm-screw arrangement corresponds to the programming switch $S_P$ in the following description and, as described below, is electrically connected to fixed resistive components which play a part in blanking the picture and muting its sound during rotation of the selector knob 32 and tuning shaft 20** to these unused channels.

In like manner, rotation of the tuning shaft 20 correspondingly rotates a waver disk 70 around a housing 90 behind the rear plate 22 to bring two of its adjacent 13 connecting tips into electrical contact with a pair of conductive clips *a*, *b* of housing 90 (FIG. **1*e***) when selecting between channels. Such arrangement corresponds to the intermediate channel switch $S_D$ in the following description, with additional electrical connections being made to fixed resistive components active in the blanking and muting operations when between channels. Tuners of this general type—but without the described arrangements for effecting the short-circuiting to ground for undesired program channels and the described connection for adjacent channel switching—are more fully illustrated as the KRK 140 tuner in the Television Service Data Sheet, File 1970, No. T14, published by the RCA Sales Corporation.

Figure 2:
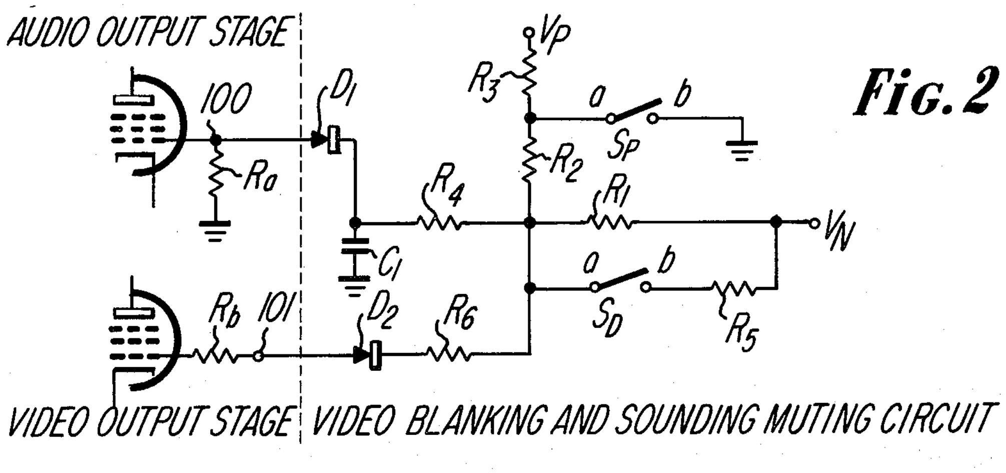
FIG. 2 illustrates a circuit for performing these functions according to the invention.

The configuration of FIG. 2 illustrates the schematic circuit according to the invention for blanking the television picture and muting its sound both between adjacent channels selected by the tuner and on unprogramed channels, for example, those which do not transmit into the geographical area where the receiver is located. As indicated, those elements located to the right of the dotted line constitute components of the blanking and muting circuit, while those components to the left represent the video and audio output stages of the receiver, for example, which are controllable to eliminate the flickering of picture and rush of sound otherwise obtainable without such controlled operations. As shown, the circuit includes six resistors $R_1$–$R_6$, a pair of semiconductor rectifiers $D_1$–$D_{2a}$, a capacitor $C_1$ and the programing and adjacent channel switches $S_P$ and $S_D$ described in connection with FIG. 1. That is, switch $S_P$ is located in the tuner as a customer control by which any undesired channel may be bypassed through simple rotation of the fine tuning mechanism until either the sound mutes or the video blanks, or both. The switch $S_D$, on the other hand, is located for operation in conjunction with the rotation of the tuning shaft.

Referring now to the drawings, it will be seen that resistors $R_1$–$R_3$ are serially coupled between a pair of potential supplies $V_N$, $V_P$. Resistor $R_4$ couples the junction of resistors $R_1$, $R_2$ to the cathode of the rectifier $D_1$, the anode of which is coupled to a terminal 100 of the controlled audio output stage, illustratively shown as the control grid of the audio output tube. In like manner, resistor $R_6$ couples the junction of resistors $R_1$, $R_2$ to the cathode of the rectifier $D_2$, the anode of which is coupled to a terminal 101 of the video output stage, for example, to the control grid of the video output tube via a resistor $R_b$. One terminal *a* of the programing switch $S_P$ (e.g., terminal post 60 in FIG. **1*d***) is connected to the junction of resistors $R_2$, $R_3$ while a corresponding terminal *a* of the adjacent channel switch $S_D$ (e.g., clip *a* in FIG. **1*e***) is connected to the junction between resistors $R_1$, $R_2$. The other, or *b*, contact of the switches $S_P$, $S_D$ (screw 40 of FIG. **1*d***, clip *b* of FIG. **1*e***) are respectively connected to ground and to the supply $V_N$, the latter through the resistor $R_5$. Lastly, the junction of resistor $R_4$ and rectifier $D_1$ is coupled to ground by the capacitor $C_1$, and a resistor $R_a$ is shown as providing grid bias to the audio output tube, coupled between the anode of rectifier $D_1$ and ground.

Figure 3:
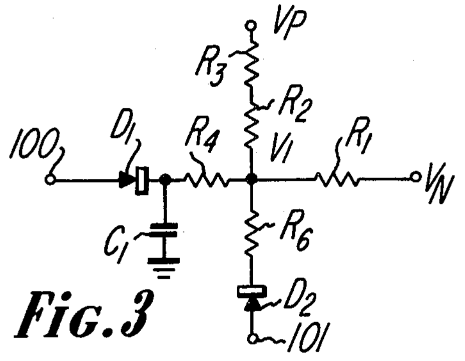
FIGS. 3–6 represent equivalent circuit diagrams for various conditions of the switch configuration of FIG. 2.

It will be readily apparent that four possible configurations exist for the switch arrangement of FIG. 2. A first possibility exists when the switches $S_P$ and $S_D$ are both open, representing the normal operation of the receiver when tuned to a desired channel. The configuration of FIG. 2 then reduces to that represented by the equivalent arrangement of FIG. 3, with respect to which it can be shown that the direct voltage developed at the junction of resistors $R_1$, $R_2$ is given by the expression:

$$V_1 = \frac{R_1 V_P + (R_2 + R_3) V_N}{R_1 + R_2 + R^3} \quad (1)$$

Where:

$V_1$ = the direct voltage developed at the junction of resistors $R_1$, $R_2$;

$V_P$ = the direct potential of the supply $V_P$ (+);

$V_N$ = the direct potential of the supply $V_N$ (−);and $R_1$, $R_2$, and $R_3$ = the resistance values of resistors $R_1$, $R_2$ and $R_3$, respectively.

It will be readily apparent that by selection of resistor and supply potential values, the voltage developed at the junction of resistors $R_1$, $R_2$ can be predetermined. Since on-channel operation of the receiver requires the audio and video output stages to be in their normal conditions of operation, the voltage $V_1$ in one embodiment of the invention was selected to be +10 volts, at which the rectifiers $D_1$ and $D_2$ will reverse bias. It will be seen that such operation eliminates any undesirable loading effects on either the audio or video output stages, thus making the receiver independent of this circuit in normal operation. Capacitor $C_1$, in this respect, serves to smooth any voltage ripple from the $V_P$ and $V_N$ supplies coupled to the cathode of rectifier $D_1$.

Figure 4:
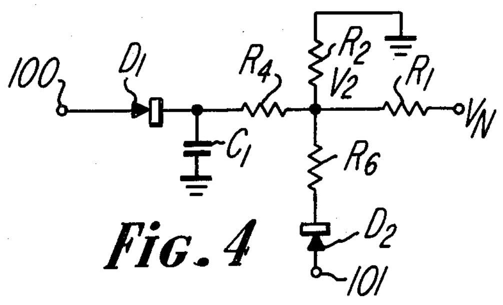

A second possibility for the switch configuration is illustrated in FIG. 4 as one in which the programing switch $S_P$ is closed but the intermediate channel switch $S_D$ is opened. Such occurence exists when the channel selector of the tuner is rotated to an undesired channel. Neglecting the loading effect of resistors $R_4$ and $R_6$—which can be made large—it can b shown that the direct voltage now developed at the junction of resistors $R_1$, $R_2$ is given by the expression:

$$V_2 = \frac{R_2}{R_1 + R_2} V_N \quad (2)$$

Where:

$V_2$ = the voltage developed at the afore-noted junction; and

Where:

$R_1$, $R_2$, and $V_N$ are as previously defined. Since the potential of the supply $V_N$ is a negative value, the direct voltage $V_2$ will also be negative. By proper selection of values for the supply $V_N$ and for the resistors $R_1$, $R_2$, $R_4$, $R_6$, $R_a$, and $R_b$, rectifiers $D_1$ and $D_2$ can be made to conduct either singly, or in combination, to apply such negative voltage to the control grids of the tubes shown as will blank the reproduced video or mute the recreated audio or both, as desired.

Figure 5:
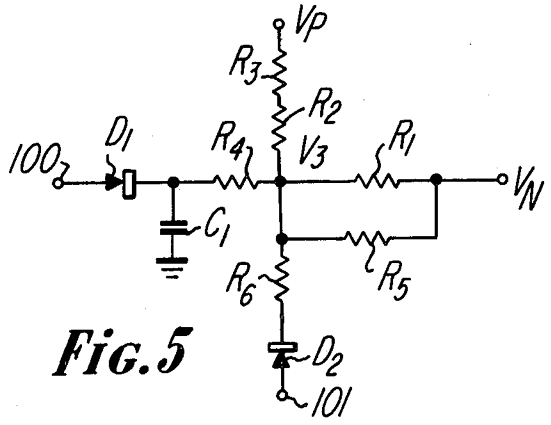

A third possible arrangement for the configuration of FIG. 2 is that shown in FIG. 5, for the case where the programming switch $S_P$ is opened and the intermediate channel switch $S_D$ is closed. This condition occurs as the tuner is rotated between adjacent channels. The direct voltage now developed at the junction of resistors $R_1$, $R_2$ can be calculated from the expression:

$$V^3=\frac{R_7V_P+(R_2+R_3)V_N}{R_2+R_3+R_7} \quad (3)$$

Where:

$V_3$ = the direct voltage developed at the aforementioned junction;

$R_7$ represents the equivalent resistance of resistors $R_1$ and $R_5$ connected in parallel, and $R_2$, $R_3$, $V_P$, and $V_N$ are as previously defined. Similarly, the equivalent resistance of the resistors $R_1$ and $R_5$ connected in parallel is expressible as:

$$R_7=R_1R_5/(R_1+R_5) \quad (4)$$

As with the arrangement of FIG. 4, the direct voltage developed at the junction of resistors $R_1$, $R_2$ is selected to be sufficiently negative to cause either or both rectifiers $D_1$, $D_2$ to conduct and clamp the control grid electrode of the audio or video output tubes to a negative potential, as desired. In this way, the audio muting and/or video blanking functions are again performed.

In one construction of the FIG. 2 embodiment of the invention, supply voltages for the sources $V_P$ and $V_N$ were selected to be +130 and −100 volts direct current, respectively. Whereas a direct voltage at the junction of resistors $R_1$, $R_2$ of +10 volts was assumed sufficient to reverse bias rectifiers $D_1$, $D_2$ for normal operation of the output stages (FIG. 3), it was assumed that direct voltage values of −40 volts would be sufficient to forward bias those rectifiers to cause disabling of the selected output stage (FIGS. 4,5). Thus, $V_1$ in expression (1) is +10 volts while $V_2$ and $V_3$ in expressions (2) and (3) are each −40 volts. Selecting resistor $R_3$ to have a value of 39 kilohms, expressions (1) and (2) can be solved to find resistor $R_1$ to have a value approximately 91.9 kilohms and resistor $R_2$ to have a value equal to 61.2 kilohms. Similar solving of expressions (3) and (4) yield the result that resistor $R_5$ is of a value equal to 57.2 kilohms. Commercially available values of resistances—namely, $R_1$ = 100K, $R_2$ = 62K, $R_3$ = 39K, and $R_5$ = 22K—were employed to enable voltages $V_2$ and $V_3$ to approximate the −40 volt direct current value desired. It was found that sufficient negative voltage could not adequately be had with values of $R_5$ closer to the calculated value due to the reflected impedance at the $R_1$, $R_2$ junction from the video and audio stages.

With these resistances for the devices $R_1 - R_3$ and $R_5$, the values of resistors $R_4$ and $R_6$ were chosen in one specific arrangement to mute the sound and blank the video simultaneously. Such values were 390 kilohms for the first of these two resistors and 220 kilohms for the second. Additionally, the value for the component $R_a$ used for grid biasing of the audio output stage was selected equal to 470 kilohms. With these values for resistors $R_4$ and $R_6$, it was found that the direct voltages $V_2$ and $V_3$ could be in error by amounts up to 10 percent and still provide the desired muting and blanking. At the same time, it will be seen that no error is thus introduced into the calculation of the voltage $V_1$ since the rectifiers $D_1$ and $D_2$ are open circuited when such condition exists, so that any variations in resistors $R_4$ and $R_6$ may be disregarded.

Figure 6:
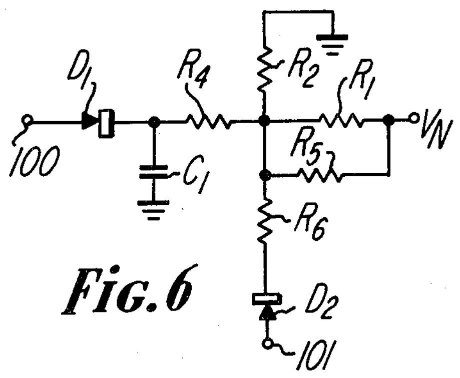

The arrangement of FIG. 6 represents the equivalent switch configuration for the case where both the programming switch $S_P$ and the intermediate channel switch $S_D$ are closed. Such instance arises during a channel change due to the tuner configuration respecting the switch contacts and rotor blade of the intermediate channel switch $S_D$—namely, that that switch $S_D$ overlaps slightly the operating range of the programing switch $S_P$. Such configuration has the effect of permitting the intermediate channel switch $S_D$ to close before the programing switch $S_P$ opens. At the same time, this construction closes the programing switch $S_P$ before the intermediate channel switch $S_D$ opens when a detent position has been reached.

As will be noted from the previous two illustrations, this configuration insures a continuous transition from the instant where only the programing switch is closed (FIG. 4) to the instant where the programing switch opens and the intermediate channel selector switch closes (FIG. 5). With the arrangement of FIG. 6, it will be seen that the described circuit serves to blank the video and mute the sound when either the programing switch or intermediate channel switch is closed or when both are closed.

Numerous advantages are present with the described switch construction shown in FIG. 2. For example, it will be seen that the bypassing of any or all undesired channels is at the disposal of the customer through the fine tuning arrangement controlling the channel programing. Through this control, each undesired channel can be video blanked and audio muted during remote tuning operation—as with the motor drive arrangements of the prior art patents previously noted—but also during manual channel selection as well. In addition, all undesirable audio and video informations are eliminated between programed channels, so as to maintain the elimination of on-rushing sound or flickering picture during such intervals. Also significantly important is the fact that the operation of the described configuration can be precisely predicted due to its dependence primarily on DC supply potentials and resistor values which can be maintained within controlled ranges of variation. This is to be contrasted with versions of blanking and muting circuits which utilize transistor characteristics in their operation and which, consequently, depend for performance on the aging and thermal environments of the semiconductor device employed.

Figure 7:
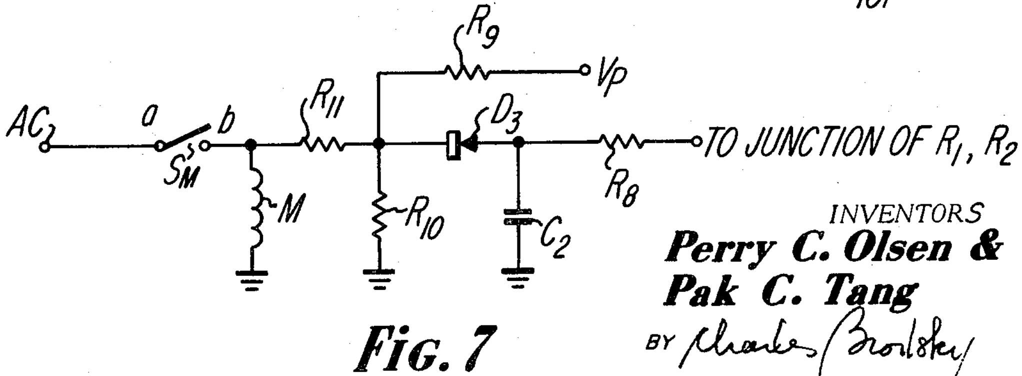
FIG. 7 shows an arrangement for operating the switch configuration of FIG. 2 by remote control.

One further feature of the disclosed invention is that it can operate either independently of, or in connection with, a remote control mechanism. Thus, the described circuit can find usefulness both in those receivers which are equipped for remote power tuning, as well as those designed solely for manual tuning. One such remote control mechanism is illustrated in FIG. 7, and is particularly attractive in that audio muting and video blanking are provided when the motor is activated. As shown, the motor is represented by a winding M, serially coupled between the terminal *b* of the remote control switch $S_M$ and ground. One end of a resistor $R_{11}$ is also coupled to this contact *b*, while its other end is connected to ground through a resistor $R_{10}$, on the one hand, and to the source of positive direct potential $V_P$ by a resistor $R_9$, on the other hand. The cathode of a semiconductor rectifier $D_3$ is connected to the junction of resistors $R_9 - R_{11}$, while the anode of the rectifier $D_3$ is coupled to the junction of resistors $R_1$, $R_2$ of FIG. 2 via a further resistor $R_8$. A capacitor $C_2$ is included to couple the junction of rectifier $D_3$ and resistor $R_8$ to ground.

As will be seen, when the switch $S_M$ is in its open position, the circuit disclosed in FIGS. 2–6 will operate as therein described since the motor M is not energized. Rectifier $D_3$, in this instance, is reverse biased by the voltage divider comprising resistors $R_9 - R_{11}$ (neglecting the DC resistance of the motor M), and is thus an open circuit. When the switch $S_M$ is closed, however, rectifier $D_3$ and capacitor $C_2$ function as a half-wave rectifier with respect to an alternating potential applied to contact *a* of the switch $S_M$, to produce by filtering, a negative voltage which is applied through resistor $R_8$ to the junction of resistors $R_1$, $R_2$. Resistors $R_{10}$ and $R_{11}$ of this arrangement are selected such that the negative voltage produced when the switch $S_M$ is closed is of sufficient negative value to forward bias the rectifiers $D_1$ and $D_2$ (FIG. 2) as will accomplish the audio muting and video blanking operations described. Since resistors $R_{10}$, $R_{11}$ are selected to provide the proper negative voltage, resistor $R_9$ is selected of a value to reverse bias the rectifier $D_3$ when the switch $S_M$ is opened. The value of resistor $R_8$, on the other hand, is chosen to cooperate with the resistors of the blanking and muting circuit to bias off both the audio and video stage when the motor switch $S_M$ is closed.

While there has been described what is considered to be a preferred embodiment of the present invention, it will be evident that other modifications—such as changing rectifier polarities, supply voltage polarities, and connections to appropriate electrodes of the audio and video output tubes—may be made by those skilled in the art. It is therefore contemplated that the appended claims be read in the true spirit and scope of the teachings disclosed herein.

What is claimed is:

1. A video blanking and sound muting circuit for a television receiver having a manually operated detenting channel selector and effective upon manual operation of said selector to de-activate the video and sound reproduction systems of said receiver during channel changing, comprising:

first and second potential sources;

a plurality of relatively fixed impedances serially coupled between said sources and forming at least one junction point Therebetween;

first and second rectifier means respectively coupling said junction point to control terminals of each of said video and sound reproduction systems to regulate the operations thereof during said channel changing;

a first switch means coupled to the junction between a first and second of said plurality of impedances and operative in conjunction with said detenting channel selector to modify the serial coupling between said first and second potential sources when said selector is manually changed to an undesired channel to establish a first direct voltage condition at said junction point; and a second switch means coupled to the junction between said second and a third of said plurality of impedances and operative in conjunction with said detenting channel selector to additionally modify the serial coupling between said first and second potential sources when said selector is manually changed between adjacent channels to establish a second, different direct voltage condition at said junction point;

said first and second potential sources and said first, second and third fixed impedances being selected such that either of said first and second direct voltage conditions is sufficient to bias at least one of said rectifier means in a direction to de-activate its associated video or sound reproduction system and such that a third direct voltage condition is developed at said junction point in the absence of said selector being manually changed to an undesired channel or between adjacent channels which is sufficient to bias both of said rectifier means in a direction to activate both their associated video and sound reproduction systems during this normal operative mode of said television receiver.

2. The circuit of claim 1 for use in a television receiver also having an electric motor adapted to drive the channel selector under a remote control order, wherein said circuit additionally includes:

third rectifier means coupled to said junction point formed on said plurality of relatively fixed impedances; and means, including a third switch means coupled to said third rectifier means, for biasing said third rectifier means in response to the energization of said motor by the giving of said remote control order in a direction to establish a direct voltage condition at said junction point sufficient to bias at least one of said first and second rectifier means in a direction to de-activate its associated video or sound reproduction system when said order is given and for biasing said third rectifier means in response to the de-energization of said motor by the absence of said remote control order in a direction to establish another direct voltage condition at said junction point sufficient to bias both of said first and second rectifier means in a direction to activate both their associated video and sound reproduction systems when said order is absent during the normal operative mode of said television receiver, whereby at least one of the video and sound reproduction systems of said receiver is further de-activated during remote control channel changing.

3. The circuit of claim 1 wherein said first and second potential sources are serially coupled by first, second and third impedances, wherein said first switch means is operative in conjunction with said detenting channel selector to bypass said first impedance when said selector is manually changed to an undesired channel, and wherein said second switch means is operative in conjunction with said detenting channel selector to shunt a fourth relatively fixed impedance across said third impedance when said selector is manually changed between adjacent channels, such that selection of said first and second potential sources and of said first, second, third and fourth impedances establish each of said direct voltage conditions at the junction point of said second and third impedances.

4. The circuit of claim 3 wherein said first and second direct voltage conditions developed at the junction point of said second and third impedances forward bias at least one of said first and second rectifier means in a direction to de-activate their associated video and sound reproduction systems and wherein said third direct voltage condition developed at said junction point reverse biases both of said first and second rectifier means in a direction to activate both their associated video and sound reproduction systems.

5. A video blanking and sound muting circuit for a television receiver having a manually operated detenting channel selector and effective upon manual operation of said selector to de-activate the video and sound reproduction systems of said receiver during channel changing, comprising:

first and second potential sources of opposite polarity;

first, second and third resistors serially coupled between said sources;

a first rectifier coupling the junction between said second and third resistors to a control terminal of said sound reproduction system to regulate its operation during said channel changing;

a second rectifier coupling said junction between said second and third resistors to a control terminal of said video reproduction system to also regulate its operation during said channel changing;

a first switch means having one contact coupled to the junction between said first and second resistors and another contact coupled to a point of reference potential, with said first switch means being operative in conjunction with said detenting channel selector to establish a first direct voltage condition at the junction of said second and third resistors when said selector is manually changed to an undesired channel;

a fourth resistor having one terminal thereof coupled to said second source of potential; and a second switch means having one contact coupled to the junction of said second and third resistors and another contact coupled to a second terminal of said fourth resistor, with said second switch means being operative in conjunction with said detenting channel selector to establish a second direct voltage condition at said junction point between said second and third resistors when said selector is manually changed between adjacent channels;

the manual changing of said detenting channel selector to an undesired channel and between adjacent channels cooperating to connect said contacts of said first and second switch means, respectively, such that said switch connections together with the values of said first and second potential sources and said first, second, third and fourth resistors establish said first and second direct voltage conditions at magnitudes sufficient to bias at least one of said first and second rectifiers in a direction to de-activate its associated video or sound reproduction system and such that a third direct voltage condition is developed at the junction point of said second and third resistors in the absence of said selector being manually changed to an undesired channel or between adjacent channels of a magnitude sufficient to bias both of said first and second rectifiers in a direction to activate both their associated video and sound reproduction systems during this normal operative mode of said television receiver.

6. The circuit of claim 5 wherein a fifth resistor is included to couple said junction between said second and third resistors to the cathode of said first rectifier, the anode of which is coupled to said sound reproduction system control terminal, wherein a sixth resistor is included to couple said junction between said second and third resistors to the cathode of said second rectifier, the anode of which is coupled to said video reproduction system control terminal, and wherein a first capacitor is included to couple the cathode of said first rectifier to said point of reference potential.

7. The circuit of claim 6 for use in a television receiver also having an electric motor adapted to drive the channel selector under a remote control order, wherein said circuit additionally includes:

seventh and eighth resistors serially coupled between said first potential source and said point of reference potential;

a third rectifier;

a third switch means;

ninth and tenth resistors respectively coupling said third rectifier to said third switch means and to said junction between said second and third resistors;

a second capacitor coupling the junction of said third rectifier and said tenth resistor to said point of reference potential;

such that energization of said motor to effect channel changing in response to the giving of said remote control order establishes a direct potential at the junction of said third rectifier and said second capacitor sufficient to bias at least one of said first and second rectifiers in a direction to de-activate its associated video or sound reproduction system when said order is given and such that said third rectifier is biased by said seventh and eighth resistors in the absence of said remote control order being given to establish another direct potential at the junction of said second and third resistors which is sufficient to bias both of said first and second rectifiers in a direction to activate both their associated video and sound reproduction systems during the normal operative mode of said television receiver, whereby at least one of the video and sound reproduction systems of said receiver is further de-activated during remote control channel changing.

8. The circuit of claim 7 wherein said eighth and ninth resistors are selected to provide said first direct potential at the junction of said third rectifier and said second capacitor of a value sufficient to bias at least one of said first and second rectifiers in a direction to de-activate its associated video and sound reproduction system when said remote control order is given.

9. The circuit of claim 8 wherein said seventh resistor is selected of a value to cooperate with said first potential source and said eight resistor to bias said third rectifier in the absence of said remote control order being given such that both of said first and second rectifiers become biased in directions to activate both their associated video and sound reproduction systems in the absence of said order.

10. The circuit of claim 9 wherein said tenth resistor is selected of a value such that the potential developed across said second capacitor and coupled to the junction of said second and third resistors will, in conjunction with said first, second, third, fourth, fifth, and sixth resistors and said first and second potential sources, bias both of said first and second rectifiers in a direction to de-activate their associated video and sound reproduction systems when said remote control order is given.

* * * * *

UNITED STATES PATENT OFFICE
CERTIFICATE OF CORRECTION

Patent No. 3,673,318 Dated June 27, 1972

Inventor(s) Perry Charles Olsen & Pak Chong Tang

It is certified that error appears in the above-identified patent and that said Letters Patent are hereby corrected as shown below:

Column 4, Equation 1 - the portion of the equation reading "$\overline{R_1 + R_2 + R^3}$" should read -- $\overline{R_1 + R_2 + R_3}$ --

Column 5, Equation 3, the portion of the equation reading "$V^3$" should read -- $V_3$ --.

Signed and sealed this 17th day of October 1972.

(SEAL)
Attest:

EDWARD M.FLETCHER,JR.
Attesting Officer

ROBERT GOTTSCHALK
Commissioner of Patents